United States Patent [19]
Davis

[11] 3,667,033
[45] May 30, 1972

[54] CRYOGENIC SINGLE SENSOR THREE COMPONENT MAGNETOMETER
[72] Inventor: Charles R. Davis, Sunnyvale, Calif.
[73] Assignee: The United States of America as represented by the Secretary of the Navy
[22] Filed: Apr. 6, 1971
[21] Appl. No.: 131,621

[52] U.S. Cl. .................................................324/43 R
[51] Int. Cl. .................................................G01r 33/02
[58] Field of Search .....................................324/43 R

[56] References Cited

UNITED STATES PATENTS 3,528,005  9/1970  Morse et al. ..........................324/43 R Primary Examiner—Rudolph V. Rolinec
Assistant Examiner—R. J. Corcoran
Attorney—Richard S. Sciascia, Don D. Doty and William T. Skeer

[57] ABSTRACT

This invention relates to an improved magnetometer using sense loops of superconducting wire. A Josephson device is used to sense the induced current flowing in the wire and to control a bucking current to nullify the current flowing in the loop. The amount of current required to reduce the current to zero is used as a measure of the intensity of the magnetic field inducing the superconducting current flow. A system for sharing a single Josephson device in a plurality of sense loops is a component part of the system of the invention.

10 Claims, 9 Drawing Figures

CHARLES R. DAVIS
INVENTOR.

BY *William T. Skeer*
AGENT

*Dee D. Doty*
ATTORNEY

CHARLES R. DAVIS
INVENTOR.

3,667,033

CRYOGENIC SINGLE SENSOR THREE COMPONENT MAGNETOMETER

STATEMENT OF GOVERNMENT INTEREST

The invention described herein may be manufactured and used by or for the Government of the United States of America for governmental purposes without the payment of any royalties thereon or therefor.

1. Field of the Invention

This invention pertains to a new and improved electronic measuring system. More particularly, the invention describes a magnetometer which employs a sense apparatus comprising three orthogonally oriented superconducting loops. The arrangement, to be more fully described herein, comprises an advance in the instrumentation arts of profound importance.

2. Description of the Prior Art

Instruments to measure magnetic fields have, in the past, been bulky and complex, particularly where the magnetic field or the changes therein are of a small order of magnitude. Further, the prior units themselves generate magnetic fields, or, in some instances, disturb the ambient magnetic field such that a plurality of magnetic field measuring units placed in close proximity to one another experience mutual interference.

Another difficulty associated with prior magnetometer devices, as instruments for measuring the properties of magnetic fields are called, concerns particular instrumentality reacting with the magnetic field. Some considerable variations in the sensitivity of these instruments have been attributable to variations in quality control and precision of manufacture of the field interacting member. Some attempts to overcome these difficulties have involved reorienting the measuring device to direct its response axis in a plurality of directions. Instruments using this arrangement are bulky, costly, and suffer from indexing inaccuracies.

Another shortcoming of prior art magnetometers which is dramatically overcome by the measuring system of the invention pertains to the amount of time and effort which is expended in the calibration of the instrument. Prior art devices generally require precise measurements and adjustments to normalize the device to a new environment or position after the device has been moved. Such adjustments require the considerable expenditure of the time of skilled personnel and, therefore, preclude the instruments from being used in portable or highly mobile operation.

SUMMARY OF THE INVENTION

This invention incorporates three mutually orthogonally disposed sense loops made of superconducting metal. The current induced in the coils by variations in the ambient magnetic fields is detected by a sensor known as a Josephson device. A calibration coil coupled to each sense loop is activated to produce a counter magnetic field to nullify the current flowing in the sense loop. The amount of electrical activation current necessary to produce the nullifying field is, then, relatable to the ambient magnetic field. The switching of the Josephson device and operation of other measuring functions may be performed sequentially by the system of the invention without further operation control. Alternately, if desired, a single loop may be monitored continuously. Provision is also made for extremely rapid calibration of the device of the invention, as will be explained herein.

With the foregoing description of the prior art in mind, it is an object of the invention to provide an improved method and means for measuring magnetic fields.

A further object of the invention is to provide a magnetometer having improved sensitivity.

Another object of the present invention is an improved magnetometer with rapid calibration capabilities.

A still further object of the present invention is to provide a magnetometer having three superconducting loops with a common sensing element.

Another object of the present invention is the provision of a magnetometer with sequential display of the magnetic field intensity in three mutually orthogonal directions.

Another object of the present invention is to provide a magnetometer which is portable, so as to facilitate mobile use thereof.

Another object of the present invention is to provide a magnetometer having automatic sequencing circuitry to sequentially share calibration and measuring instrumentation between a plurality of sensor inputs.

Another object of this invention is to provide a switching system for performing sequential switching operations in instrument applications.

A still further object of the present invention is to provide a magnetometer comprising a plurality of superconductor sense elements which have a common shared transducer means which is sequentially switched from one sense element to another.

Other objects and many of the attendant advantages will be readily appreciated as the subject invention becomes better understood by reference to the following detailed description, when considered in conjunction with the accompanying drawings.

DESCRIPTION OF THE PREFERRED EMBODIMENT

Figure 1:
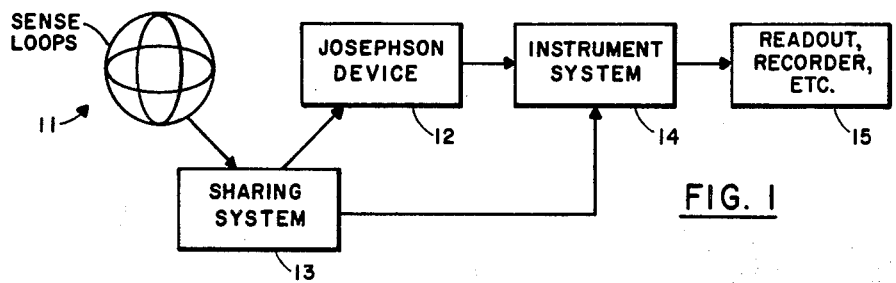
FIG. 1 is a block diagram showing diagrammatically the relationship of major components.

Referring to FIG. 1, the basic components of the system are shown in their cooperative arrangement. A sense loop system 11 is connected to a Josephson device 12 by a sharing system 13. Sharing system 13 is a switching system to permit a single Josephson device to be used in a plurality of sense loops on a shared time basis. The output from Josephson device 12 is connected to an instrument system 14, which comprises suitable amplification and detection circuitry, as well as clock and synchronizing circuitry, and performs control functions to be explained herein. Suitable readout circuitry 15 is attached to instrument system 14 to provide display or utilization.

Sense loop system 11 is exposed to ambient magnetic fields to respond to variations therein, and comprises three loops made of superconducting material, e.g., niobium. The individual loops are designated as "$x$," "$y$," and "$=z$" loops to correspond to the conventional Cartesian coordinates, but, if desired, they may be arranged at other than right angles to one another at the expense of some mutual interference.

Once cooled to superconducting temperatures, the electrical current flowing in a sense loop is a function of the magnetic flux passing through the loop. The precise relationship is well understood and is governed by the general expression
$$\Delta\phi = eI$$
where
$\Delta\phi$ = change in magnetic flux density in webers;
$e$ = inductance in heneries; and $I$ = current in amperes.

The direction of current flow is such that it opposes the change of flux, so as to keep the enclosed flux constant. For a 2.5 cm loop the relation is approximately:

$$\phi = 1/20\ I\ \text{(in micro amps)}$$

Nominal changes in the earth's magnetic field strength, as might accompany the passage of a ship, are seen to produce current changes which may easily be detected by modern instrumentation techniques.

The measurement of the superconducting current flowing within each sense loop without interrupting the loop is accomplished by the use of a Josephson device. The particular Josephson device used in conjunction with each sense loop in this invention is known as a Clark slug. The Clark slug comprises a length of superconducting niobium wire passing through a spherical ball of tin-lead solder. When connected in circuit with a sensor loop, the electrical current between the solder ball and the niobium wire exhibits a sinusoidal relationship with the magnetic field therebetween. This field, of course, is proportionally dependent on the superconducting current flowing in the niobium wire. Since the superconducting current flowing within the aforesaid sense loop, as previously pointed out, is dependent on the magnetic flux enclosed thereby, the output of the Josephson device is a function of the strength of the magnetic field producing the flux. A more complete description of Josephson devices is given in "The Handbook of Physics," 2nd Edition, McGraw-Hill, New York, 1967, on pages 5–172 and 5–173.

The present state of the art does not encourage the use of a separate Josephson device in each loop. The variations in response sensitivity of individual Josephson devices would result in a device with different sensitivities in different directions and complex calibration procedures and circuitry to obtain uniform response to variations in magnetic intensity along the individual axis.

Figure 2:
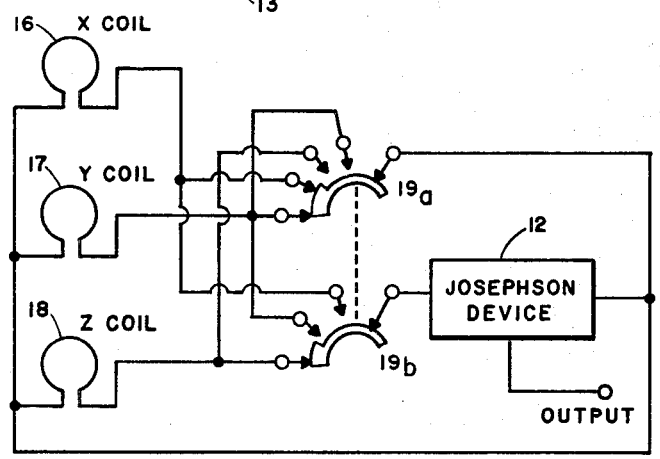
FIG. 2 is a diagrammatic illustration of a mechanical analog of the sense loop switch according to the invention.

Referring to FIG. 2, a mechanical switching version of the system is shown for purposes of explanation. Sense loop system 11 is shown as comprising three coils 16, 17, and 18, labeled "$x$" coil, "$y$" coil, and "$z$" coil respectively. Coils 16, 17, and 18 have one end joined to a common lead which is connected to Josephson device 12 and to the rotor of switch 19a. The other side of Josephson device 12 is connected to rotor of switch 19b. As indicated by the broken line, switch sections 19a and 19b are interconnected to turn together through three positions. It will be observed that switch 19a is a three position, four contact switch with coils 16 and 18 connected to the intermediate contacts and coil 17, the y coil, connected to the extreme contacts. The wiper of the rotor of switch 19a contacts two contacts thereof for each position of the switch so as to shunt two of the coils. At the same time, switch 19b, which is a three position - three contact switch, selects a single contact to be connected to Josephson device 12. The contacts of switch 19b are connected to sense coils 16, 17, and 18 in such a fashion that the coil not shunted by switch 19a, in any position thereof, is selected to be joined to Josephson device 12. In this fashion Josephson device 12 may be connected to any desired sense coil, with simultaneous shunting of the remaining sense coils to effectively remove them from Josephson device 12 at that particular time. In actual usage the switching is accomplished by thermally disturbing superconducting circuits, as will be more completely explained herein.

Figure 3:
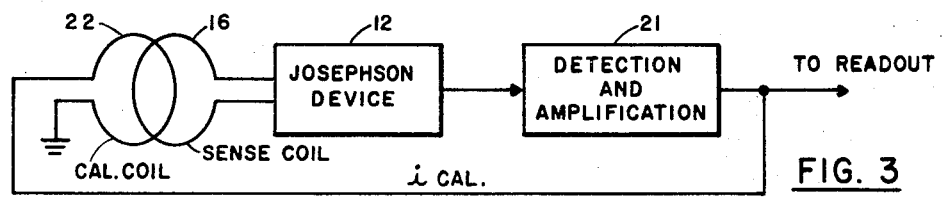
FIG. 3 shows, in simplified form, how the calibration function of Applicant's invention is accomplished.

Considering now FIG. 3, the basic operational technique of the system will be explained. The current flowing in sense coil 16, for example, is connected to flow through Josephson device 12. The output of Josephson device 12 is detected and amplified by detection and amplification circuitry 21 and applied to calibration coil 22.

Calibration coil 22 is placed in cooperative juxta-position with sense coil 16, for the calibration of the "$x$" sense coil, while similar calibration coils 23 and 24 are placed in cooperative juxta-position with sense coils 17 and 18, respectively, for the same purpose. Calibration coil 22 is connected so as to oppose, or "buck out," the current flowing in sense coil 16. This negative feedback system keeps the sense coil current at zero. Because the sense coil initially is caused to have no current flowing therein, the amount of calibration current necessary to restore this condition is related to the change in external field causing the current. The initial conduction state is obtained by a circuit switching system to be more completely described herein.

Figure 4:
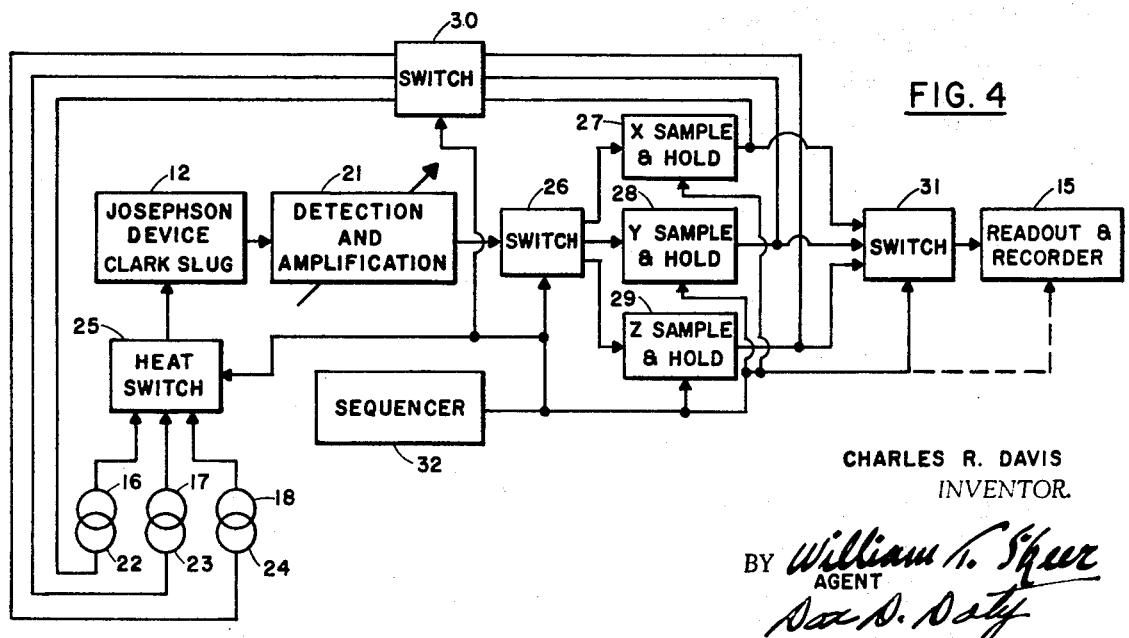
FIG. 4 illustrates a simplified block diagram of the major components of the system of the invention.

Referring now to FIG. 4, the operation of the entire system will be discussed. Sense coils 16, 17, and 18 are connected to Josephson device 12 or shunted, as explained above, by a switch 25. The output of Josephson device 12 is connected to an amplification and detection circuit 21 which, as shown, may be adjustable as to gain. Amplification and detection circuit 21 is connected by a suitable switch 26 to an "$x$" sample and hold circuit 27, a "$y$" sample and hold circuit 28, and a "$z$" sample and hold circuit 29. The outputs of sample and hold circuits 27, 28, and 29 are connected by a switch 30 to their associated calibration coils 22, 23, and 24. The outputs are also connected by a switch 31 to readout and recorder 15.

Switches 25, 26, 30, and 31 are sequentially advanced by a sequencer circuit 32. An output from sequencer 32 may also be applied to readout and recorder 15, as shown by the broken connection line. Switch 25 in the preferred embodiment is a thermally activated superconductor network. Switches 26, 30, and 31 are controlled semiconductors. As will be presently explained, sequencer circuit 32 comprises a clock circuit and associated counters and logic components.

Figure 5:
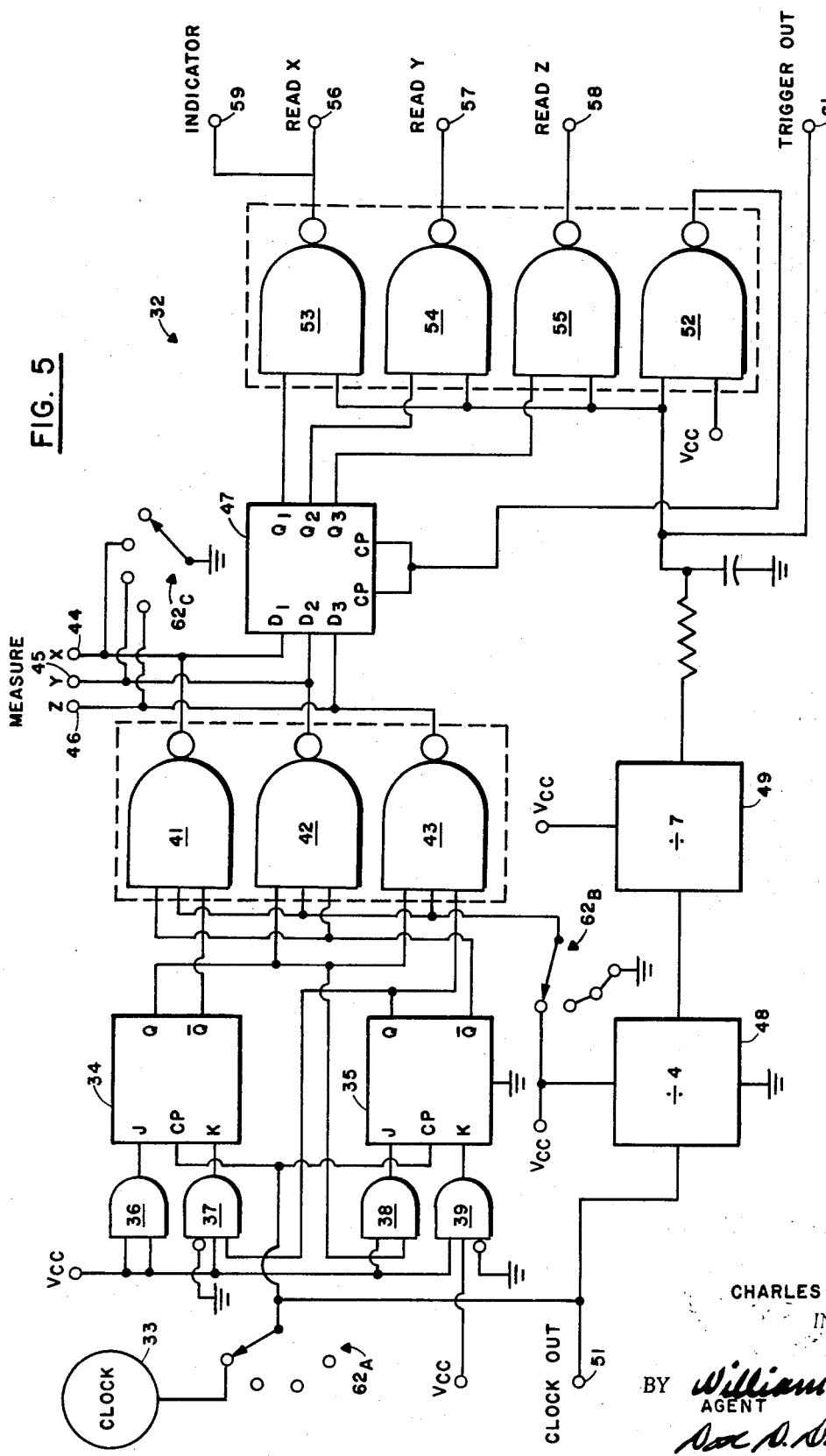
FIG. 5 is a block diagram of the sequencer component of the magnetometer of the invention.

Referring to FIG. 5, sequencer circuit 32 is shown in greater detail. A clock circuit 33 applies output pulses to a pair of JK flip-flops 34 and 35. JK flip-flops 34 and 35 are interconnected via suitable AND gates 36, 37, 38, and 39, so as to produce a series of three sequentially occurring outputs. The present state of the art in micro electronics permits JK flip-flops 34 and 35 and AND circuits 36, 37, 38, and 39 to be incorporated into a single package. Several manufacturers produce suitable circuitry. One such microcircuit package which has proven successful in developmental models is marketed under the designator 9020. However, if desired, the individual circuits may be separately mounted as shown.

The output from JK flip-flops 34 and 35 is decoded by NAND gates 41, 42, and 43 to sequentially ground three output terminals 44, 45, and 46. The outputs of NAND gates 41, 42, and 43 are also applied to shift register 47. As shown by the broken surrounding box, NAND gates 41, 42, and 43 may comprise a single micro-circuit. One such circuit which has proven satisfactory is marketed under the designator 9003, however, others may also be used.

Still referring to FIG. 5, it will be observed that the clock pulses from clock 33 are applied to a divide-by-four circuit 48 which, in turn, applies its output to a divide-by-seven circuit 49. If clock 33 has a 15 hertz output, as in one successful developmental model, the output from divide-by-seven circuit 49 occurs each 28/15 seconds, or approximately once every 2 seconds. It will also be observed that clock 33 has an output applied to a terminal 51.

The output of divide-by-seven circuit 49 is applied to quad latch 47 via NAND gate 52. The quad latch 47 is clocked by the divide-by-seven circuit 49 approximately once every 2 seconds to trigger NAND gates 53, 54, and 55 sequentially. NAND gates 52, 53, 54, and 55 may be incorporated in a single micro circuit unit, as the broken line surrounding indicates. The outputs of NAND gates 53, 54 and 55 are connected to output terminals 56, 57, and 58 which are labeled read "$x$," read "$y$," and read "$z$," respectively. It will also be noted that another output terminal 59, labeled "Indicator" is connected to NAND gate 53.

Also shown in FIG. 5, output terminal 61 is connected to deliver an output of divide-by-seven circuit 49 to be used as an external trigger. For example, the broken line connection between sequencer circuit 32 and readout and recorder circuit 15, shown in FIG. 4, might use an output trigger from terminal 61 to reset a digital voltmeter. This is the arrangement employed in a successful developmental model of the device.

Although other types of readout devices may not require the trigger signal, such as an oscilloscope, for example, terminal 61 is shown for complete illustration of a preferred embodiment.

Figure 7:
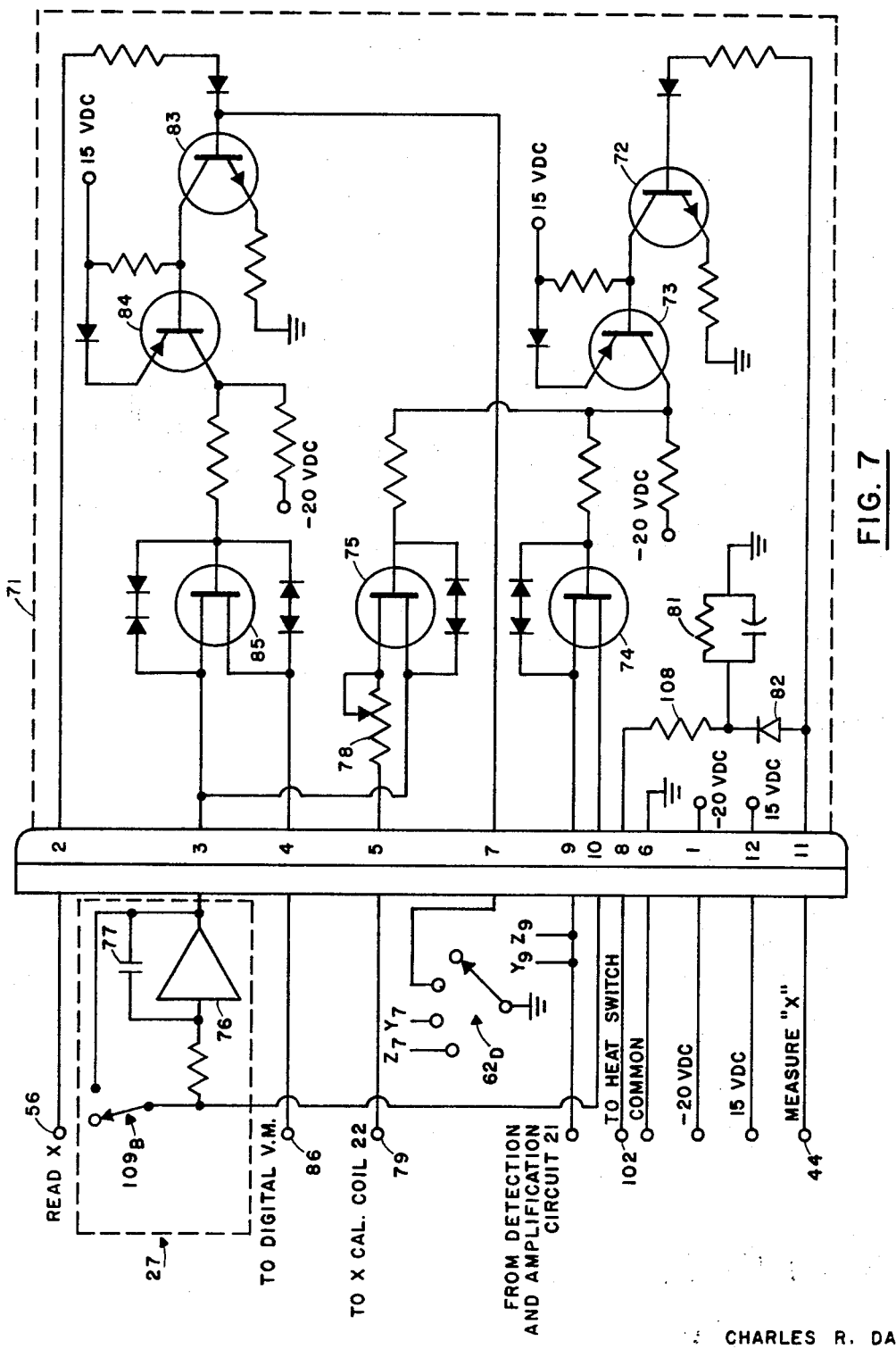
FIG. 7 is a block diagram of the measure and hold circuitry of the invention together with circuit details of the associated switch circuitry.

Mode switch 62 is the remaining detail of FIG. 5 to be described. Mode switch 62 is a four position, four gang switch, three gangs of which are shown in FIG. 5 and one gang is shown in FIG. 7, to be described presently. The gangs are designated 62A, 62B, 62C, and 62D, respectively, and are all shown in the same position. The gangs are actuated by a common means and, therefore, turn in unison. As the name implies, mode switch 62 controls the mode of operation of the magnetometer. In the illustrated position, the systems function to automatically scan the three sense loops, loops 16, 17, and 18, to sequentially read the magnetic field sensed by each in turn. This mode is substantially as described previously. In any of the remaining positions, a single loop is monitored continuously. Switch gang 62A breaks the connection between clock 33 and JK flip-flops 34 and 35 in any position other than the automatic mode position illustrated. Switch gang 62B removes the operating voltage from NAND gate circuits 41, 42, and 43 and grounds these circuits in any position other than the illustrated automatic mode position. Switch gang 62C selectively grounds terminals 44, 45, or 46 in successive positions other than the illustrated automatic mode position.

Figure 6:
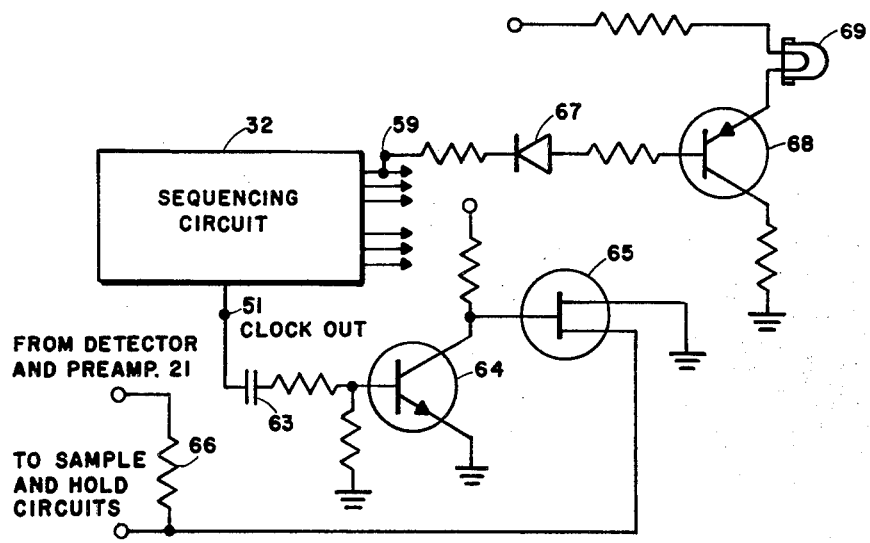
FIG. 6 shows associated switching and indicator circuits used in conjunction with the sequencing circuit of the invention.

Before describing other circuit components of the system, two circuits whose functions are quite closely associated with sequencing circuit 32 will be described. Referring to FIG. 6, it will be seen that the clock output from a terminal 51 is applied, via a capacitor 63, to the base of a transistor 64 to control the conduction thereof. Transistor 64 controls the conduction of a field effect transistor 65, herein referred to as FET 65. FET 65 functions as a switch to short the output of detection and amplification circuitry 21 during clock pulses. As shown, the amplified output is normally coupled by a resistor 66, however, during conduction periods of FET 65, the output end of resistor is effectively grounded.

It will also be noted that output terminal 59 applies the read "$x$" signal via a diode 67 to the base of a transistor 68. The presence of the read "$x$" signal on its base causes transistor 68 to conduct. A lamp 69 connected in series with transistor 68 is thereby energized. This indicates that it is the "$x$" sense loop that is being read. Since the sequencing order is determined by sequencer circuit 32, no other indicator circuits are necessary for the automatic mode. Of course, additional indicators may be employed if desired. Also, it should be noted that, under some circumstances, it may be necessary to use a plurality of transistors rather than use single transistor 68. Such circuit modifications are believed within the scope of one versed in the electronic arts having the benefit of the above teachings.

Referring to FIG. 7, the circuit diagram for "$x$" sample and hold circuit 27 and associated portions of switches 26 and 31, previously illustrated as blocks in FIG. 4, is shown. For purposes of simplicity, the identical circuitry for the "$y$" and "$z$" channels is omitted from the description. It will be noted that a portion of the circuitry is mounted on a plug-in board 71, indicated by broken line surround and plug symbol. The connectors for the illustrated "$x$" channel are conventionally designated $x_1 x_2$, $x_3$, etc. and will be so referenced herein. Similarly, the connectors for the "$y$" and "$z$" channel boards, now shown, will be referenced in the same manner with the numerical portion of the reference indicating the same connector on the other board. Another convenient simplification is circuitry notation used in the figure is the minimal showing of power distribution circuitry. As shown, the external power connections are made via connectors $x_1$, $x_6$, and $x_{12}$, and the completion of the circuitry omitted with only appropriate supply points shown.

It may be seen that the circuit of FIG. 7 receives the sense signal on connector $x_9$ which is in parallel with the $y_9$ and $z_9$ connectors. Digital control information is coupled to connectors $x_2$ and $x_{11}$ from sequencer circuit 32. The read "$x$" terminal 56 is connected to $x_2$ and the measure $x$ terminal 44 is connected to $x_{11}$. The remaining section of mode switch 62, section D, is connected to $x_7$ and may also be considered a signal input. Outputs, as will be discussed, are taken from connectors $x_4$, $x_5$, and $x_8$.

Connector $x_{11}$ is connected to apply the measure $x$ signal to the base of a transistor 72 to control the conduction thereof. Transistor 72, in turn, controls the conduction of a transistor 73 which is connected to the gates of suitable FETS 74 and 75 to effect simultaneous operation thereof. In its conducting stage, FET 74 applies the signal from detection and amplification circuit 21, connector $x_9$, to the input of "$x$" sample and hold circuit 27 comprising an operational amplifier 76 shunted by a capacitor 77.

As may be readily seen, operational amplifier 76 and capacitor 77 are connected to form an integrator. When its input circuit is open, corresponding to the integrand equaling zero, it holds the value stored. When the input is connected in the feedback loop of the system, it ceases to function, in the system, as an integrator and becomes a gain dependent control. From a circuit analysis point of view, amplifier 76 amplifies the output of Josephson device 12 and feeds it back out of phase to effect a reduction of the output to zero. From a theoretical point of view, amplifier 76 and associated circuitry function as a single pole with its location in the complex plane. The value of the pole is gain dependent. The open loop gain of the system is primarily dependent on the input circuit to the integrator, the internal resistance of cal coil 22 (in the case of the "$x$" circuit), the gain of amplifiers 21 and 76, and the characteristics of Josephson device 12. In such a system it is obvious that there are several points at which the gain may be controlled, such as the adjustable gain of amplifier 21, for example. Any suitable operational amplifier may be used for amplifier 76, however, for completeness it should be noted that a unit marketed by Philbrick Researches, Inc. of Dedham, Massachusetts, USA, under the designation P65AU has proven satisfactory in developmental models.

Still with reference to FIG. 7, it will be observed that the conduction of FET 75 effectively connects the output of amplifier 76 to calibration coil 22 via resistor 78, connector $x_5$, and terminal 79. It may be seen, therefore, that a measure "$x$" control signal from terminal 44 causes sample and hold circuit 27, i.e., amplifier 76, to be connected in the system loop to perform its sample function. It should also be noted that a measure "$x$" control signal at connector $x$ $x_{11}$ provides a conduction path to bypass current limiting resistor 81 via diode 82 to control the heat switching of switch 25, to be presently described.

Terminal 56, the "read $x$" output from sequencer circuit 32, is connected via terminal $x_2$ to the base of a transistor 83 to control the conduction thereof. Transistor 83, in turn, controls the conduction state of transistor 84 which is connected to the gate of a suitable FET 85. FET 85, when conducting, connects the output of operational amplifier 76 to an output terminal 86 to be fed therefrom to a digital volt meter or other device comprising readout and record circuit 15.

It will be observed that switch section 62D may be positioned to selectively ground the base of transistor 83 to effect the same switching condition as if a read "$x$" signal had been applied. Thus, in this position of switch 62D the device reads the "$x$" sense loop condition continuously. Sequentially arranged contacts perform identical functions for the "$y$" and "$z$" circuits. It should be borne in mind that the previously described sections of switch 62 interrupt the action of sequencer circuit 32 for positions thereof which cause the output of amplifier 76 to be connected to readout and record circuit 15.

Figure 8:
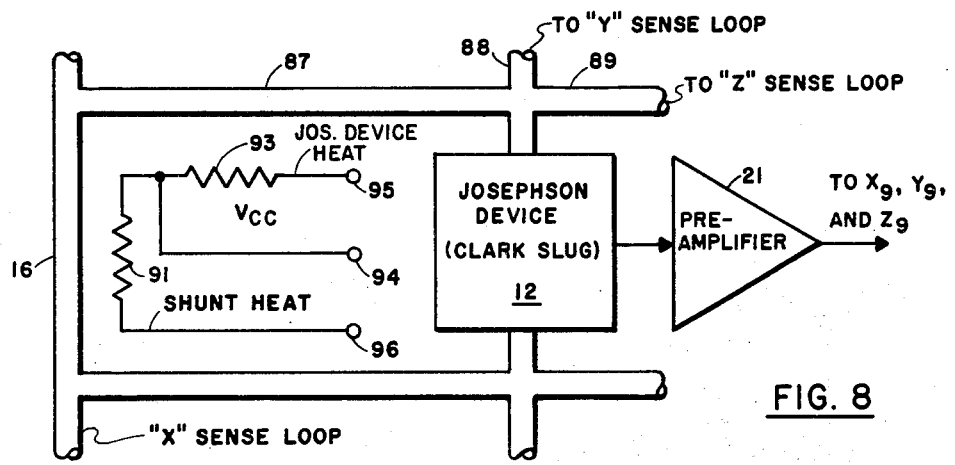
FIG. 8 is an illustration of the heat operated switch used in the superconducting portion of the invention.

Referring now to FIG. 8, the details of the circuitry used to obtain the sequential substitution of the Josephson device in each sense loop will be described. Josephson device 12 is joined to each sense loop by superconducting shunts 87, 88, and 89. The current flow through loops 16, 17, and 18 and shunts 87, 88, and 89 is controlled by electrical resistance heaters placed adjacent the elements. As will be recognized by those familiar with superconductor circuitry and cryogenic cooling, the amount of heating necessary to cause the transition to and from the superconducting state is quite small and may easily be applied by low wattage heaters 91 and 92, positioned adjacent "$x$" sense loop 16 and shunt 87. A similar arrangement is, of course, used with the other loops and shunts. Heater 91 is positioned in cooperating relationship to loop 16 and controls the superconductivity in that portion of the loop between the legs of shunt 87. Heater 92 is positioned in cooperative relationship to the legs of shunt 87 and, in a similar fashion, controls the conduction in shunt 87. Heater 91 is supplied operating voltage via terminal 94 and is controlled by the timely provision of a ground return via terminal 96. Heaters 92 and 93 are connected in parallel and are supplied operating potential via terminal 94 and have their ground return supplied via terminal 96.

The timely grounding of terminal 95 and the opening of terminal 96 causes heater 92 to be heated and elevate shunt 87 from the superconducting state to cause the superconducting current to flow around sense loop 16. Reversing the potential of terminals 95 and 96 causes heater 91 to elevate the temperature of the heated portion of loop 16 from the superconducting state and permit the cooling of shunt 87 to the superconducting state. This condition channels the superconducting current through Josephson device 12, a Clark slug in the incident invention, where it is detected and amplified by circuit 12 and fed to connectors $x_9$, $y_9$, and $z_9$ of the sample and hold circuitry, as previously explained in connection with FIG. 7. Amazingly, this switching requires but one millisecond and is accomplished with negligible loss of sense loop current.

Referring to FIG. 7, the circuitry to accomplish the timely completion of the heat switch circuits will be explained. As will be observed, terminals 95 and 96, for the "$x$" loop switching circuit, together with terminals 97 and 98, for the "$y$" loop switching circuit, and terminals 99 and 101, for the "$z$" loop switching circuit, are connected to terminals 102, 103, and 104 through suitable diode networks. For example, when terminal 102 becomes grounded, a circuit is established from shunt heat switch terminal 96 through a diode 105. No similar circuit is available for the other two shunt heat switches connected to terminals 98 and 101. Similarly, Josephson device heat switch terminals 97 and 99 have circuits through suitable diodes 106 and 107, respectively. No similar energization circuit exists for Josephson device heat switch terminal 95. Thus, it is seen that the grounding of terminal 102 causes the energization of the "$x$" shunt heat switch and the "$y$" and "$z$" Josephson device heat switches. This condition corresponds to the measure $x$ logic command from sequencer circuit 32.

For practical reasons, terminals 102, 103, and 104 are not opened and grounded since such operation would cause excessive delay in the operation of the heat switch elements. Rather than open-circuit the terminal, a current limiting resistance is used to permit more rapid heating.

Referring once again to FIG. 7, the current limiting resistance is seen to comprise suitably valued resistors 81 and 108. The value of resistor 81 is chosen to keep the thermal level near but below the point at which electrical switching occurs. When a measure "$x$" pulse occurs, resistor 81 is bypassed by diode 82, as previously explained. Similar resistor and diode networks in the "$y$" and "$z$" circuits control the conduction for terminals 103 and 104.

Figure 9:
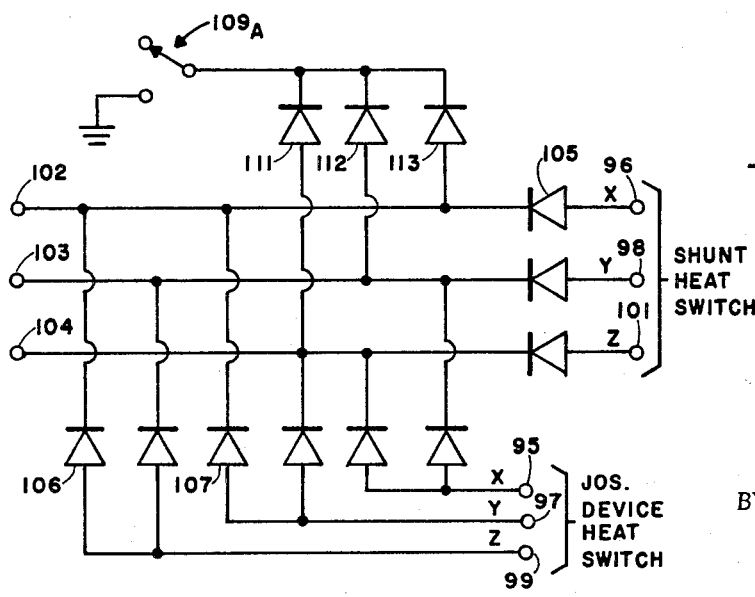
FIG. 9 is a diagrammatic showing of the diode switch network used in the invention.

In order to establish a reference level at the new location when the instrument is moved, an initialize circuit is provided. This circuit, previously referred to, is shown in FIGS. 7 and 9, and comprises a four-pole, two-position switch 109 and associated circuitry. One of the poles, referenced 109A, is shown, in FIG. 7, connected via suitable diodes 111, 112, and 113 so as to selectively ground all of the conductors attached to terminals 102, 103, and 104. The grounded condition corresponds to the non-illustrated position of switch 109A. With respect to the diode switching circuit of FIG. 9, the condition corresponds to a measure pulse appearing simultaneously in all channels, a condition not obtainable from the logic circuitry of sequencer circuit 32. The remaining sections of switch 109 cooperate with the individual sample and hold circuits 27, 28, and 29.

FIG. 7 is illustrative of one of these arrangements, sample and hold circuit 27. From the figure, it may be seen that when moved to its non illustrated position, switch 109B discharges integrating capacitor 77. Similarly, switch 109C and 109D cooperate with sample and hold circuits 28 and 29, not illustrated in detail, to produce the same result in each channel. In the operative position, switch 109 establishes the operative reference level for all channels simultaneously to provide a new reference operating level.

The foregoing description of a preferred embodiment is to be considered exemplarily and is subject to modifications in construction obvious to skilled instrumentation artisans. Thus, other constructions of switching circuitry may be employed for the FETS shown, silicon controlled rectifiers may be used, for example. Similarly, other means of biasing the operational points of operation of the heater control such as a series ballast regulator system might be used, if desired. These and similar modifications of the circuit elements which do not depart from the circuit concept are considered to be within the scope of the skilled artisan, depending upon the particular application in which the invention is utilized.

Although the foregoing description is a complete description of the invention, enabling a person versed in the art to make and use the device, the invention may be better understood with reference to the following description of its contemplated mode of operation and the appended claims.

MODE OF OPERATION

The particular mode, or manner, of operation of the individual circuit components of the invention either has been explained in connection with the structural description, or is the obvious function thereof. Therefore, this description will be directed toward the manipulation of the system and the specific cooperation of the individual system components.

The initial procedure in the operation of the system of the invention is, quite naturally, the delivery of the instrument package to the desired location where the magnetic sensing is desired. In a pure instrumentation system, for which the invention was conceived, this involves the placement of the system in a stable position, such as on a platform or firm natural foundation. In other applications, appropriate installation may require more elaborate mounting arrangements. As an example, if used as an airline boarding surveillance device, some means of concealing the instrument package from view of passengers may be necessary while, at the same time, permitting the readout to be accessible to authorized personnel. The variety of installations possible preclude a more detailed discussion of the particular problems that might be encountered.

Once installed in the desired location, the system is normalized to the ambient magnetic field in the vicinity by actuating the initialize switch, switch 109. This switch position, as previously discussed, causes all sense loops of the system to have the induced current therein bucked out by its associated calibration coil while the integrator portion of the associated sample and hold circuit is shorted out of the system. When switch 109 is restored to its illustrated position, the system functions in its normal fashion in dependence upon the position of mode switch 62.

Assuming mode switch 62 to be in the automatic position, that is, in the illustrated position, the operation of the magnetometer is controlled by sequencer circuit 32. The circuit operation of sequencer circuit 32, which was explained in connection with FIG. 5, provides a read signal on one of terminals 56, 57, or 58 while, at the same time, providing measure signals on two of the terminals 44, 45, and 46. Of course, the read signal is on the terminal associated with the channel not being supplied a measure signal. The action of sequencer circuit 32 is such as to cycle all channels through the measure-read cycle at regularly reoccurring intervals. In such a position, the operation of the system may be explained with reference to FIG. 4.

The superconducting current flowing within sense loops 16, 17, and 18 is initially zero as a result of the use of neutralization switch 109, as previously explained. A change in the ambient magnetic field, as might be occasioned by the close passage of a ferrous body such as a ship, piece of marine ordinance, or other object whose detection is desired, causes a change in flux in the area enclosed by sense loops 16, 17, and 18 and a corresponding change in the superconducting current flowing therein. The superconducting current change causes a corresponding change in the output of Josephson device 12, a Clark slug in the preferred embodiment, which is coupled to detection and amplification circuit 21. Josephson device 12 is sequentially placed in cooperating circuit arrangement with each of sense loops 16, 17, and 18 by the action of switch 25 and the amplified output thereof from detection and amplification circuit 21 is connected to a sequentially operating switch 26. Switch 26 applies the output of amplification and detection circuit 21 to sample and hold circuits 27, 28, and 29 associated with sense loops 16, 17, and 18 respectively. The outputs of each of sample and hold circuits 27, 28, and 29 are applied to both readout and recorder 15 and one of the calibration coils 22, 23, and 24 by switches 31 and 30 respectively. Switches 25, 26, 30, and 31 are actuated in a sequential fashion by sequencer circuit 32. The gain of the system may be adjusted by a control on detection and amplifier 21, as indicated by the arrow shown therewith, to assure sufficient gain to cancel the current flowing in sense loops 16, 17, and 18. The amount of power necessary to accomplish this cancellation for each sense loop is stored in the associated sample and hold circuit 26, 27, or 28 and read by readout and recorder circuit 15 at the appropriate time.

As explained in connection with the construction of FIG. 6, an indicator light accompanies the readout indication for a selected channel, the "x" channel in the instant case. Quite naturally, the skilled instrumentation system designer and builder may use more than the single indicator shown if he so desires.

Upon the receipt of a read signal to the appropriate channel, the output of the sample and hold circuit associated with that channel is switched to readout and recorder circuit 15. A digital volt meter has performed satisfactorily in this capacity in the device of the invention.

When a measure pulse is applied to the appropriate channel, the output of the sample and hold circuit associated therewith is switched to energize the calibration coil associated with that channel. The amplified output causes the current flowing in the sense coil to be reduced to zero. The amount of current required to effect this null is indicated by the stored value in the sample and hold circuit which is read out upon receipt of the proper logic pulse, as previously noted.

When switch 62 is placed in any of its other three positions, the action of sequencer circuit 32 is interrupted. The output of the associated sample and hold circuit is connected to readout and recorder circuit to present a continuous readout for that particular sense loop.

The foregoing description taken together with the appended claims constitute a disclosure such as to enable a person skilled in the oceanographic and geophysical instrumentation arts and having the benefit of the teachings contained therein to make and use the invention. Further, the structure herein described and the improved measurement methods made possible thereby meet the objects of the invention, and generally constitute a meritorious advance in these arts, and the related arts of object detection, which would have remained unobvious to such skilled artisans not having the benefit of the teachings contained herein.

Obviously, other embodiments and modifications of the subject invention will readily come to the mind of one skilled in the art having the benefit of the teachings presented in the foregoing description and the drawings. It is, therefore, to be understood that this invention is not to be limited thereto and that said modifications and embodiments are intended to be included within the scope of the appended claims.

What is claimed is:

1. An improved magnetometer comprising in combination:
   a plurality of superconductor sensor means having superconducting electrical current flowing therein, having a predetermined orientation with respect to each other, and having a predetermined spatial orientation in a medium having a magnetic field therein for sensing variations thereof;
   single transducer means responsive to variations of said superconducting electrical current flowing within said superconducting sensor means for producing an output signal in response thereto;
   first switching means connected between said superconductor sensing means and said single transducer means for selectively connecting said transducer means with a single one of said superconductor sensor means without significant interruption of said superconducting current flow therein;
   means connected to said single transducer means in such manner as to receive the output signal therefrom for increasing the electrical power thereof;
   a plurality of sample and hold circuit means for receipt and storage of the output of said amplification means;
   second switching means connected between said amplification means and said plurality of sample and hold circuit means for selective connection of the output of said amplification means to a selected one of said sample and hold circuit as an input thereto;
   calibration coil means disposed in cooperative relationship with each of said plurality of superconductor means for inducing an opposing current therein;
   third switching means connecting said plurality of sample and hold circuit means and each of said calibration coil means for selective signal transfer therebetween, whereby the increased power signal is used to cancel out the superconducting electrical current flowing in a selected one of said superconductor sensor means;
   readout means for indicating the value of the signal stored in individual ones of said sample and store circuit means;
   fourth switching means connected between said plurality of sample and hold means and said readout means for providing selective connection between said readout means and a single one of said plurality of sample and hold means; and
   sequencer circuit means connected in circuit relationship with said first, second, third, and fourth switch means for synchronous operation thereof.

2. A magnetometer according to claim 1 in which said single transducer means comprises a Clark slug.

3. A magnetometer according to claim 1 in which said first switching means comprises thermal heater means placed in cooperative relation to said plurality of superconducting sensor means for selectively controlling the superconductivity of a portion of each thereof.

4. A magnetometer according to claim 3 further comprising diode network means electrically connected to the thermal heater means comprising said first switching means and effectively electrically connected to the aforesaid sequencer circuit means for control of the electrical current through said thermal heater means in response to an output of said sequencer circuit means.

5. A magnetometer according to claim 1 in which each of said sample and hold circuit means comprises an operational amplifier and a capacitor connected in parallel therewith, so as to perform integrating functions.

6. A magnetometer according to claim 5 further comprising fifth switching means connected in circuit with said operational amplifier and said capacitor, so as to selectively provide a discharge path for the electrical charge on said capacitor for providing an initial setting therefor.

7. A magnetometer according to claim 6 in which said fifth switching means is also electrically connected to the aforesaid first switching means for actuation thereof independently of said sequencer circuit means.

8. A magnetometer according to claim 1 in which said second, third, and fourth switching means comprise solid state controlled conduction devices.

9. A magnetometer according to claim 8 in which said solid state controlled conduction devices are field effect transistors.

10. A magnetometer according to claim 1 in which said sequencer circuit comprises in combination:

clock circuit means for producing a series of timed pulses;

logic circuit means connected to said clock circuit means so as to receive said timed pulses therefrom for establishing a predetermined pulse program in response thereto; and actuation circuit means connected to said logic circuit means so as to receive said pulse program therefrom for effecting control of said first, second, third, and fourth switching means.

* * * * *